US008400466B2

(12) United States Patent
Yamamoto

(10) Patent No.: US 8,400,466 B2
(45) Date of Patent: Mar. 19, 2013

(54) IMAGE RETRIEVAL APPARATUS, IMAGE RETRIEVING METHOD, AND STORAGE MEDIUM FOR PERFORMING THE IMAGE RETRIEVING METHOD IN THE IMAGE RETRIEVAL APPARATUS

(75) Inventor: Shinobu Yamamoto, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 911 days.

(21) Appl. No.: 12/076,020

(22) Filed: Mar. 13, 2008

(65) Prior Publication Data
US 2008/0225316 A1    Sep. 18, 2008

(30) Foreign Application Priority Data

Mar. 13, 2007    (JP) .................................. 2007-063606

(51) Int. Cl.
G09G 5/00    (2006.01)
G06K 9/46    (2006.01)
G06K 9/66    (2006.01)

(52) U.S. Cl. .......................... 345/619; 345/625; 382/190

(58) Field of Classification Search ........................ None
See application file for complete search history.

(56) References Cited

U.S. PATENT DOCUMENTS

| 5,369,742 | A * | 11/1994 | Kurosu et al. ................. 715/209 |
| 5,696,892 | A * | 12/1997 | Redmann et al. .............. 345/582 |
| 6,008,807 | A * | 12/1999 | Bretschneider et al. ....... 715/732 |
| 6,243,501 | B1 * | 6/2001 | Jamali ............................ 382/305 |
| 6,463,432 | B1 * | 10/2002 | Murakawa ....................... 1/1 |
| 6,970,602 | B1 * | 11/2005 | Smith et al. ................... 382/232 |
| 7,281,199 | B1 * | 10/2007 | Nicol et al. .................... 715/203 |
| 7,386,789 | B2 * | 6/2008 | Chao et al. ..................... 715/239 |
| 7,391,917 | B2 * | 6/2008 | Ohta et al. ..................... 382/253 |
| 7,432,940 | B2 * | 10/2008 | Brook et al. ................... 345/629 |
| 7,548,916 | B2 * | 6/2009 | Kaneda ............................ 1/1 |
| 7,593,961 | B2 * | 9/2009 | Eguchi et al. .................. 1/1 |
| 7,801,392 | B2 * | 9/2010 | Koyama et al. ............... 382/305 |
| 2001/0031072 | A1 * | 10/2001 | Dobashi et al. ............... 382/118 |
| 2005/0071755 | A1 * | 3/2005 | Harrington et al. ........... 715/511 |

(Continued)

FOREIGN PATENT DOCUMENTS

JP    01-106268    4/1989
JP    07-121557    5/1995

(Continued)

OTHER PUBLICATIONS

Abstract of JP 07-037036 published on Feb. 7, 1995.

(Continued)

*Primary Examiner* — M Good Johnson
(74) *Attorney, Agent, or Firm* — Harness, Dickey & Pierce

(57) ABSTRACT

An image retrieval apparatus, which is included in an image forming apparatus and has a storage medium storing a machine-readable program to perform an image retrieving method, includes a retrieving unit configured to search and retrieve a target image similar to specified image data in a storage unit storing a distinctive feature area image stored in association with the target image as a key image, an extracting unit configured to extract the distinctive feature area image associated with the target image retrieved by the retrieving unit, and a display control unit configured to control a display unit having a display screen to display the distinctive feature area image or multiple distinctive feature area images on the display screen in a given time interval in an order according to distinctive feature area image type.

15 Claims, 10 Drawing Sheets

U.S. PATENT DOCUMENTS

| | | | |
|---|---|---|---|
| 2007/0133907 A1 | 6/2007 | Yamamoto et al. | |
| 2007/0230810 A1* | 10/2007 | Kanatsu | 382/243 |
| 2008/0082907 A1* | 4/2008 | Sorotokin et al. | 715/210 |
| 2008/0292212 A1* | 11/2008 | Ozaki | 382/284 |

FOREIGN PATENT DOCUMENTS

| | | |
|---|---|---|
| JP | 07-271819 | 10/1995 |
| JP | 09-081583 | 3/1997 |
| JP | 09-114923 | 5/1997 |
| JP | 3344774 | 8/2002 |
| JP | 2003-331299 | 11/2003 |
| JP | 2005-063220 | 3/2005 |
| JP | 2007-164513 | 6/2007 |
| JP | 4001846 | 8/2007 |

OTHER PUBLICATIONS

Abstract of JP 2005-017592 published on Jan. 20, 2005.
Office Action dated Dec. 20, 2011 issued in corresponding Japanese Application No. 2007-063606.

* cited by examiner

REDUCED IMAGES

INPUT

OUTPUT

FIG. 4
EXTRACTING DISTINCTIVE FEATURE AREAS
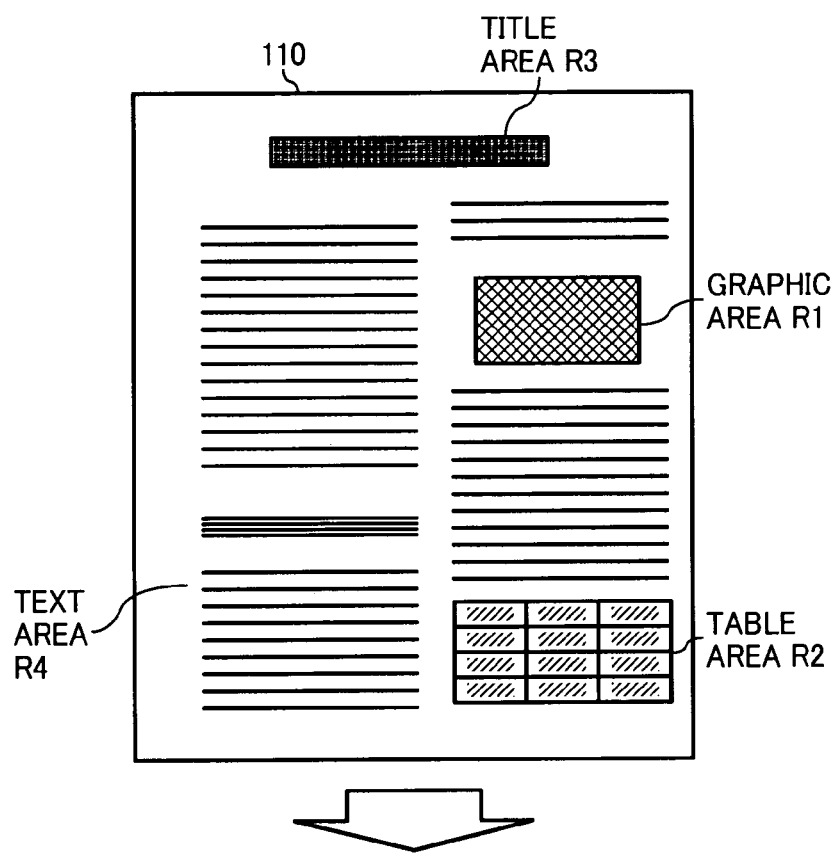
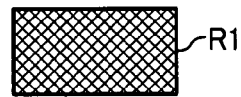
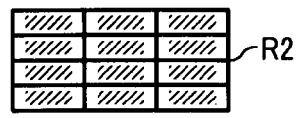

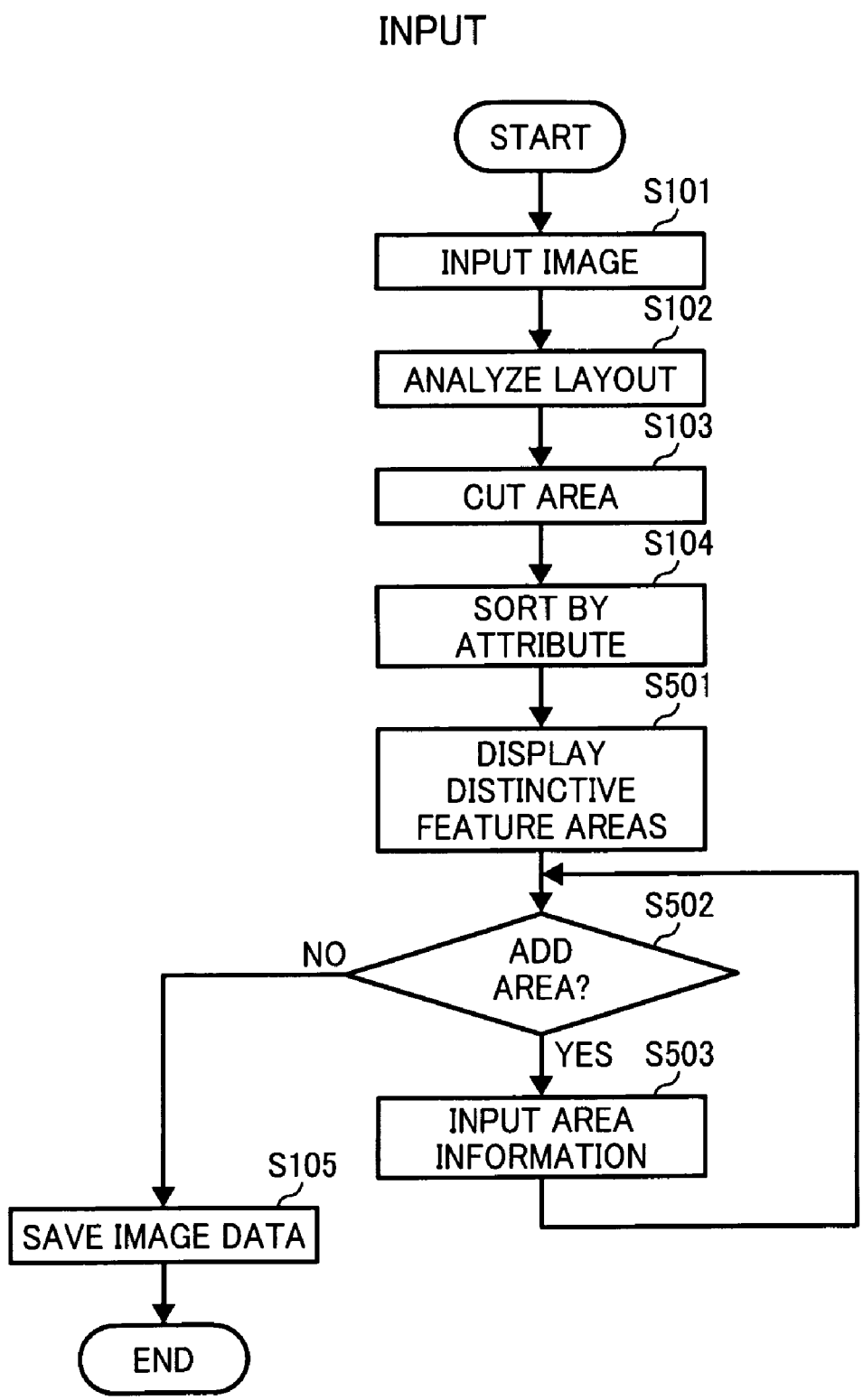

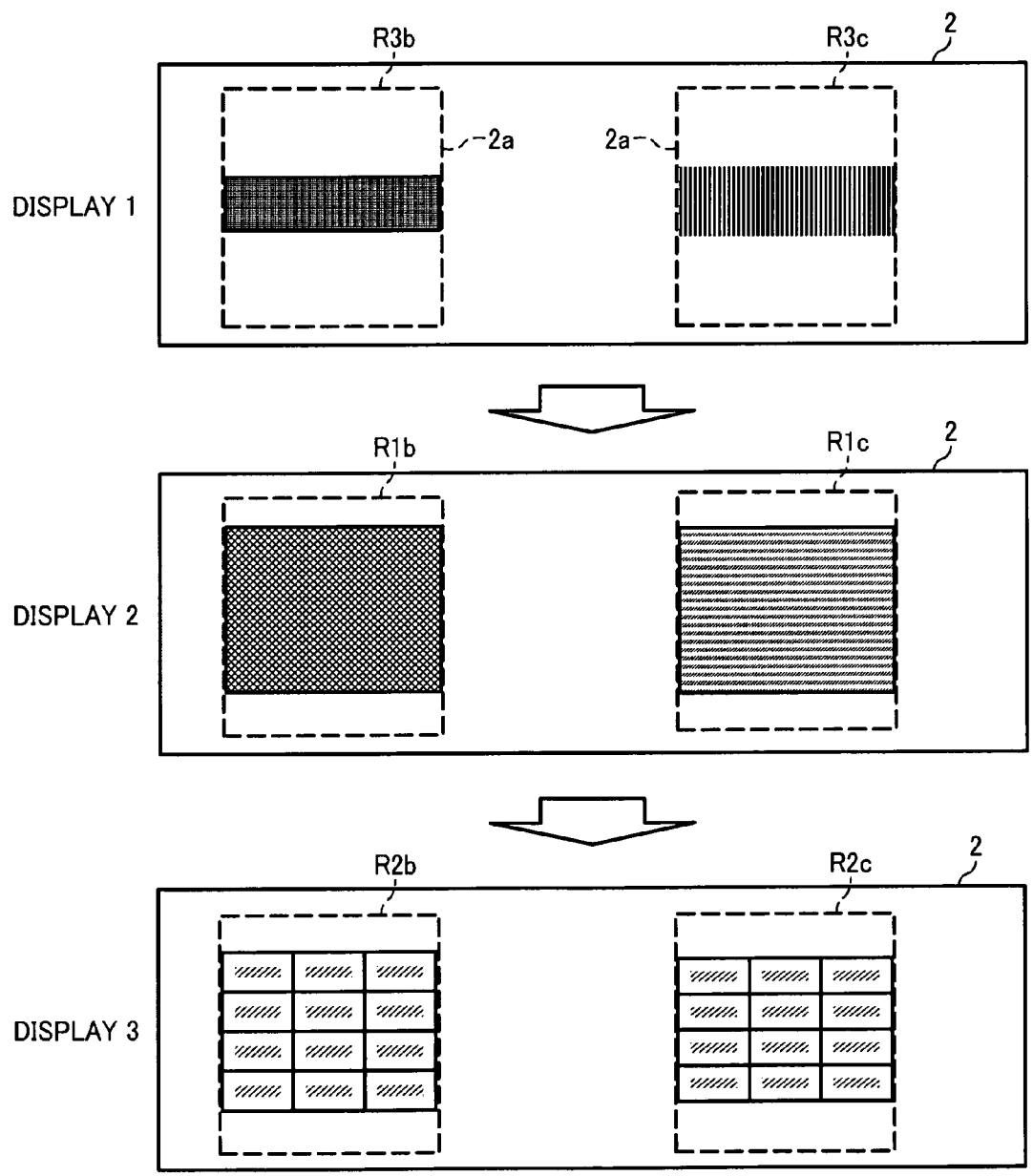

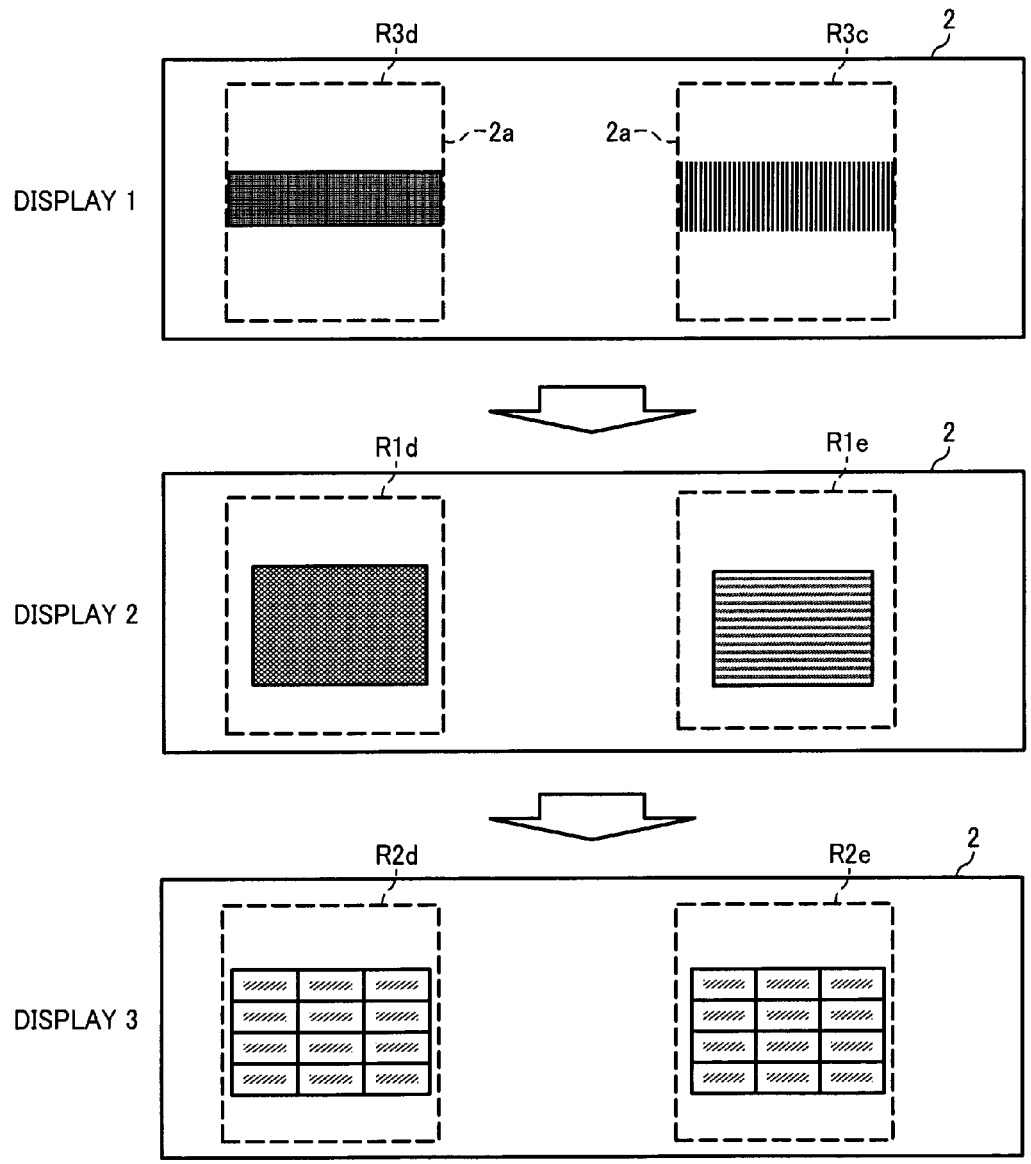

IMAGE RETRIEVAL APPARATUS, IMAGE RETRIEVING METHOD, AND STORAGE MEDIUM FOR PERFORMING THE IMAGE RETRIEVING METHOD IN THE IMAGE RETRIEVAL APPARATUS

PRIORITY STATEMENT

The present patent application claims priority under 35 U.S.C. §119 from Japanese Patent Application No. 2007-063606, filed on Mar. 13, 2007 in the Japan Patent Office, the contents and disclosure of which are hereby incorporated by reference herein in their entirety.

BACKGROUND

1. Field

Example embodiments of the present patent application generally relate to an image retrieval apparatus, an image retrieving method, and a storage medium thereof, and particularly to an image retrieval apparatus included in an image forming apparatus or an image processing apparatus so as to retrieve an image similar to specified image data, an image retrieving method used in the image retrieval apparatus, and a storage medium storing a machine-readable program for causing the image retrieval apparatus to perform the image retrieving method.

2. Discussion of the Related Art

Ordinary or general image retrieval apparatuses have a configuration to input and store image data and retrieve the stored image data when needed. Further, such general image retrieval apparatuses may have a function that can retrieve similar images.

When such general image retrieval apparatuses include a data display unit that is not large enough to display the stored image data or the like, a user may confirm the stored image data, for example, by checking such image data information contents as names, dates, registrants, file sizes, etc. listed up and displayed via the data display unit. The user may also confirm the stored image data through a reduced image, e.g., a thumbnail-size image of the entire image data that is selected intuitively. However, when such reduced images are used, the user cannot reliably distinguish between similar though not identical images.

For example, FIG. 1 shows a display screen using a related-art technique in which reduced images are displayed.

In FIG. 1, a reduced image of an entire original document 10 and a reduced image of an entire original document 10a that resembles the original document 10 are displayed side by side on the image display unit 2 or a display screen. As shown in FIG. 1, the reduced image of the original document 10 and the reduced image of the original document 10a have the same layout. That is, from the reduced images one cannot tell the differences between the original document 10 and the original document 10a. Therefore, details of the original document 10 and the original document 10a may need to be examined to find if there is any difference between them.

In using such a reduced image, there are some techniques to distinguish one image from another image of similar layout.

In one technique, for example, a reduced image preparing part reads electronic data such as image data, documents prepared by a word processor, or data created by a spreadsheet program, and then prepares the reduced images. A difference determining part then finds a degree of similarity between each of the plurality of prepared reduced images. When the degree of similarity is larger than a given threshold value, the difference image preparing part cuts areas of different portions out of the similar images and an image displaying part displays the portions to aid in distinguishing the images.

In another technique, a document sorting unit extracts respective layouts of a plurality of documents and sorts the documents into categories based on the layouts, a dissimilarity extraction unit extracts dissimilar portions in each document, and a dissimilarity display unit displays only the portions extracted by the dissimilarity extraction unit. Further, a similarity extraction unit extracts similar portions in each document, and a similar portion display unit displays only the portions extracted by the similarity extraction unit.

The forgoing techniques display images of a lesser degree of similarity out of the multiple partial images of an original image when the reduced images are similar to each other. Thus, by displaying such images of lesser similarity, similar images can be distinguished even when the reduced images of the respective entire image data are similar to each other and difficult to distinguish.

Further, in another technique, a document file acquisition unit acquires a document file, a reduced image generation unit generates a reduced image of an image of the document file acquired by the document file acquisition unit, a processed area determination unit determines a processed area in the image of the document file when the reduced image displayed on a display is specified with a pointer, an extracting unit for extracting information in the processed area extracts information in the processed area from the document file, and a display unit for the information in the processed area displays the information in the processed area on the display in a specified size. With this configuration, when an operator specifies a focused portion of the reduced image displayed on the display, an area in the vicinity of the specified portion is extracted from the original image data of the reduced data. Then, information is extracted from the area so that the extracted information can be output to display. Accordingly, by displaying information of the focused portion of the reduced image, different image data having similar reduced images can be distinguished.

However, when multiple results of retrieval are displayed in the first technique and the second technique, the multiple results of retrieval are displayed as reduced images due to a limitation in size of a display unit. With the reduced images, it is difficult for a user to learn respective features of the images. Therefore, to display a distinctive feature area image of the retrieval results, an image having a least similar image with respect to a partial image in other images is displayed.

However, such a distinctive feature area image according to the first technique and the second technique is an image having a least similarity with respect to the partial image in the other image displayed as the retrieval results. The distinctive feature image is simply an image that is related to the other images, and may not be the distinctive feature area of the original image. Further, when many images are displayed as the retrieval results, the amount of calculation required may slow the processing speed.

Further still, it is not effective to display the information of the focused portion of the reduced image without knowing in advance which portions can be different or having enough experience to predict the difference. When the operator lacks such information or experience, the operator may need to specify the focused portion randomly, which is not efficient.

Finally, as described above, after the operator specifies the focused portion, the area in the vicinity of the specified portion is extracted from the original image data of the reduced data, and the operator must wait while the above-described operation is processed. When a more complex operation is performed, the operator must wait longer than for a simple operation.

SUMMARY

In light of the foregoing, the inventors of the present application propose to provide, in at least one embodiment, an image retrieval apparatus included in an image forming apparatus and an image retrieving method used in an image retrieving apparatus included in an image forming apparatus and a storing medium storing a machine-readable program for causing an image retrieval apparatus included in an image forming apparatus to perform an image retrieving method for retrieving a target image similar to specified image data can reduce or even eliminate at least one of the drawbacks of the above-described techniques. In at least one embodiment, an image retrieving apparatus is provided that includes a simple configuration achieved at low cost, that can extract multiple representative distinctive feature areas having images similar to specified image data, that can display the multiple representative distinctive feature areas in given time intervals in an order of specified types or categories of the multiple representative distinctive feature areas, that can avoid complex processing, and that can increase operability of effectively searching and retrieving a target image.

One or more embodiments of the present patent application have been made, taking the above-described circumstances into consideration.

An embodiment of the present patent application provides an image retrieval apparatus that includes a retrieving unit configured to retrieve a target image similar to specified image data from a storage unit storing a distinctive feature area image stored in association with the target image as a key image, an extracting unit configured to extract the distinctive feature area image associated with the target image retrieved by the retrieving unit, a display unit having a display screen to display the distinctive feature area image, and a display control unit configured to cause the display unit to display multiple distinctive feature area images on the display screen in a given time interval in an order according to distinctive feature area image type.

The display control unit may control the display unit to display the multiple distinctive feature area images according to distinctive feature area image type size.

The display control unit may sort the multiple distinctive feature area images to determine whether each of the multiple distinctive feature area images is displayed or not according to the distinctive feature area image type.

The display control unit may obtain, in advance, a location of a representative distinctive feature area of the distinctive feature area image, and determine an order of display of multiple representative distinctive feature areas according to location when multiple representative distinctive feature areas are switched to display.

The display control unit may obtain, in advance, a size of a representative distinctive feature area of the distinctive feature area image, and determine an order of display of multiple representative distinctive feature areas according to size when multiple representative distinctive feature areas are switched to display.

The display control unit may obtain, in advance, attribute information of a representative distinctive feature area of the distinctive feature area image, and determine an order of display of multiple representative distinctive feature areas according to the attribute information when multiple representative distinctive feature areas are switched to display.

The display control unit may be configured to vary the size of the representative distinctive feature area to fit the display screen of the display unit.

At least one embodiment of the present patent application provides an image retrieving method for retrieving a target image similar to specified image data, the image retrieving method including the steps of retrieving the target image from a storage unit storing a distinctive feature area image stored in association with the target image as a key image, extracting the distinctive feature area image associated with the target image retrieved by the retrieving unit, and displaying multiple distinctive feature area images on a display screen of a display unit according to distinctive feature area image type.

The displaying step may include displaying the multiple distinctive feature area images according to distinctive feature area image type size.

The displaying step may include sorting the multiple distinctive feature area images to determine whether each of the multiple distinctive feature area images is displayed or not according to distinctive feature area image type.

The displaying step may include obtaining, in advance, a location of a representative distinctive feature area of the distinctive feature area image, and determining an order of display of multiple representative distinctive feature areas according to location when multiple representative distinctive feature areas are switched to display.

The displaying step may include obtaining, in advance, a size of a representative distinctive feature area of the distinctive feature area image, and determining an order of display of multiple representative distinctive feature areas according to size when multiple representative distinctive feature areas are switched to display.

The displaying step may include obtaining, in advance, attribute information of a representative distinctive feature area of the distinctive feature area image, and determining an order of display of multiple representative distinctive feature areas according to the attribute information when multiple representative distinctive feature areas are switched to display.

The displaying step may include varying the size of the representative distinctive feature area to fit the display screen of the display unit.

At least one embodiment of the present patent application provides a storing medium storing a machine-readable program for causing an image retrieval apparatus included in an image forming apparatus to perform an image retrieving method for retrieving a target image similar to specified image data, the image retrieving method including the steps of retrieving the target image from a storage unit storing a distinctive feature area image stored in association with the target image as a key image, extracting the distinctive feature area image associated with the target image retrieved by the retrieving unit, and displaying multiple distinctive feature area images on a display screen of a display unit according to distinctive feature area image type.

BRIEF DESCRIPTION OF THE DRAWINGS

The accompanying drawings are intended to depict example embodiments of the present patent application and should not be interpreted to limit the scope thereof. The accompanying drawings are not to be considered as drawn to scale unless explicitly noted.

A more complete appreciation of the disclosure and many of the attendant advantages thereof will be readily obtained as the same becomes better understood by reference to the following detailed description when considered in connection with the accompanying drawings, wherein:

FIG. 4 is a schematic drawing of an original document and respective distinctive feature areas of the original document extracted by the image retrieval apparatus according to an example embodiment of the present patent application;

FIG. 8 is a flowchart for performing a procedure of an operation in which the operator determines whether or not to specify the representative distinctive feature area;

FIG. 9 is a schematic diagram of the display screen sequentially displaying the representative distinctive feature images of FIG. 5 in a manner of varying the size thereof; and FIG. 10 is a schematic diagram of the display screen sequentially displaying the representative distinctive feature images of FIG. 5 in a manner of varying the size thereof with a relative magnification ratio.

DETAILED DESCRIPTION OF EXAMPLE EMBODIMENTS

Figure 1:
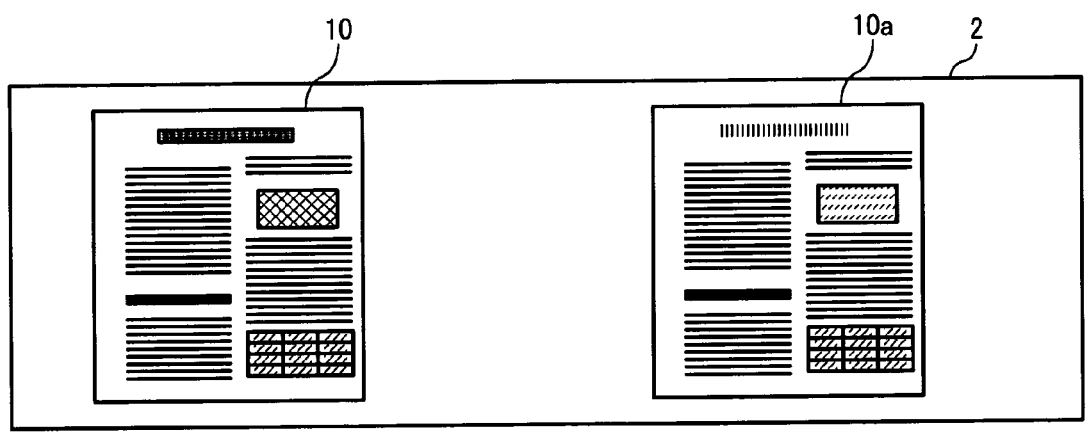
FIG. 1 is a schematic diagram of a display screen according to a related-art technique.

It will be understood that if an element or layer is referred to as being "on", "against", "connected to" or "coupled to" another element or layer, then it may be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" may encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used only to distinguish one element, component, region, layer or section from another region, layer or section. Thus, a first element, component, region, layer or section discussed below could be termed a second element, component, region, layer or section without departing from the teachings of the present patent application.

The terminology used herein is for the purpose of describing example embodiments only and is not intended to be limiting of the present patent application. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent application is not intended to be limited to the specific terminology so selected and it is to be understood that each specific element includes all technical equivalents that operate in a similar manner.

Referring now to the drawings, wherein like reference numerals designate identical or corresponding parts throughout the several views, example embodiments of the present patent application are described.

Now, example embodiments of the present patent application are described in detail below with reference to the accompanying drawings.

Descriptions are given, with reference to the accompanying drawings, of examples, example embodiments, modification of example embodiments, etc., of a sheet conveying device according to the present patent application, and an image forming apparatus including the same. Elements having the same functions and shapes are denoted by the same reference numerals throughout the patent application and redundant descriptions are omitted. Elements that do not require descriptions may be omitted from the drawings as a matter of convenience. Reference numerals of elements extracted from the patent publications are in parentheses so as to be distinguished from those of example embodiments of the present application.

Figure 2:
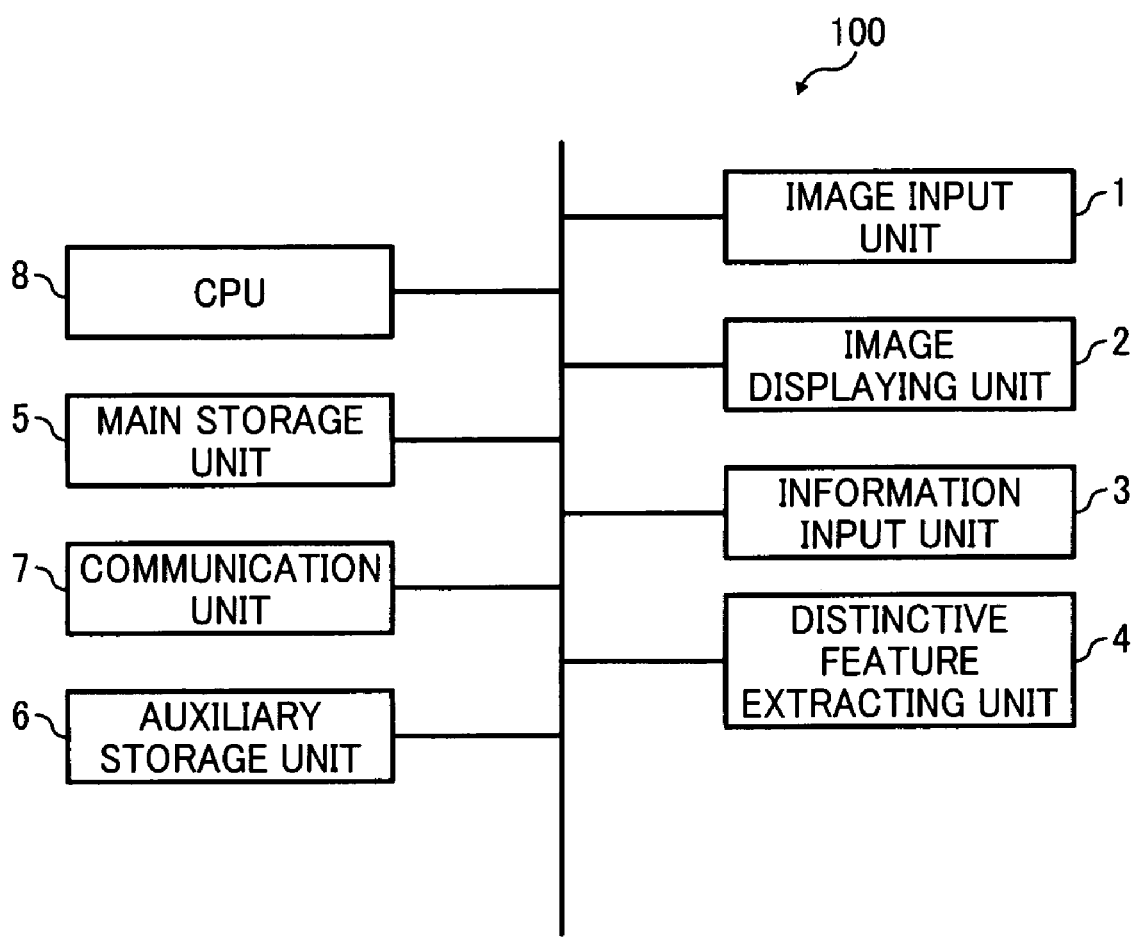
FIG. 2 is a schematic diagram of an image retrieval apparatus according to an example embodiment of the present patent application.

Referring to FIG. 2, a schematic diagram of an image retrieval apparatus 100 according to an example embodiment of the present patent application is described. The image retrieval apparatus 100 is included in an image forming apparatus or an image processing apparatus.

In FIG. 2, the image retrieval apparatus 100 includes an image input unit 1, an image display unit 2, an information input unit 3, a distinctive feature extracting unit 4, a main storage unit 5, an auxiliary storage unit 6, a communication unit 7, and a central processing unit or CPU 8.

The image input unit 1 inputs and reads image data such as scanner.

The image display unit 2 such as a liquid crystal display displays the input image data or image data stored in a database such as the auxiliary storage unit 6. The image display unit 2 may serve as a display unit and include a display screen to display images thereon.

The information input unit 3, such as a mouse or a touch panel, inputs information of specified areas and remarkable points with respect to the image data.

The distinctive feature extracting unit 4 serves as an extracting unit and extracts a representative distinctive feature area from the image data.

The main storage unit 5 temporarily stores data to be processed.

The auxiliary storage unit 6 stores the image data and the multiple representative distinctive feature areas by associating with the image data.

The communication unit 7 communicates with external units to exchange data via a network.

The CPU 8 serves as a retrieving unit to search and retrieve the representative distinctive feature areas similar to specified image data. When the representative distinctive feature areas associated with the image data are extracted by the distinctive feature extracting unit 4, the CPU 8 also serves as a display control unit to cause the image display unit 2 to display the representative distinctive feature areas on the display screen of the image display unit 2.

Figure 3A:
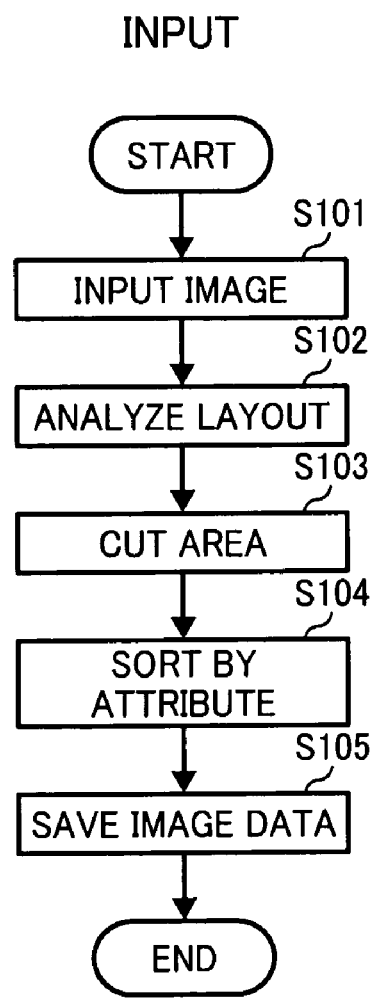
FIG. 3A is a flow chart for performing a processing procedure for image data input in the image retrieval apparatus of FIG. 2.
Figure 3B:
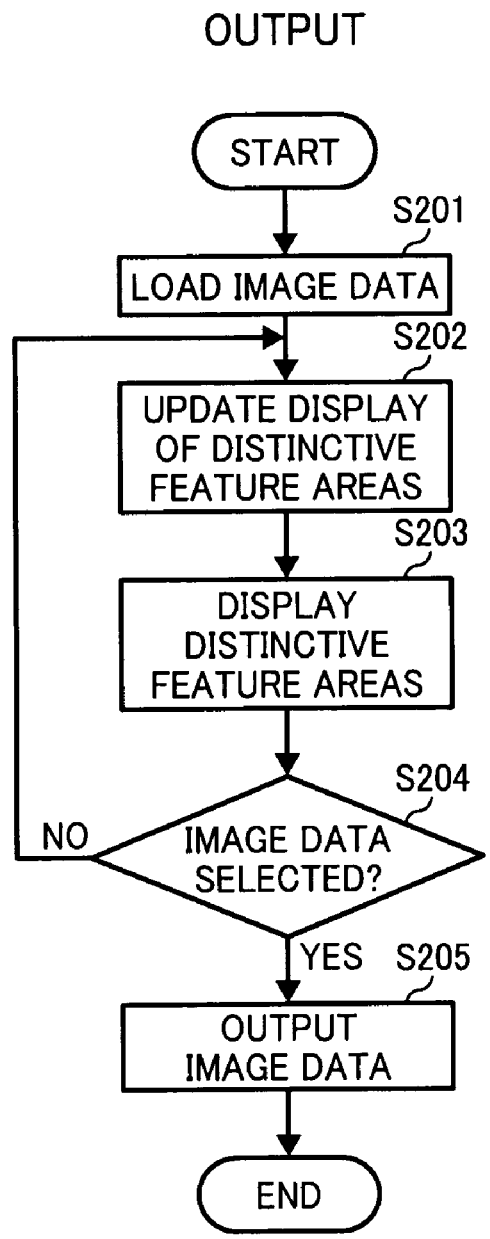
FIG. 3B is a flowchart for performing a processing procedure for image data output in the image retrieval apparatus of FIG. 2.

Referring to FIGS. 3A and 3B, flowcharts show processing procedures of the image processing apparatus, executed by the CPU 8 shown in FIG. 1. Specifically, FIG. 3A shows a flowchart showing a processing procedure for image data input, and FIG. 3B shows a flowchart showing a processing procedure for image data output.

In FIG. 3A, at the start of the processing procedure for image data input, the CPU 8 causes the image input unit 1 to input image data (step S101), the distinctive feature extracting unit 4 to sequentially analyze a layout of the input image data (step S102), then cut out areas (step S103), and sort the cut areas by attribute into text, title, graphic, photo, table, and so forth (step S104) so that the image data and the selected areas are saved and stored in association with the image data (step S105). Thus, representative distinctive feature areas may be extracted.

Even through details are not described here, known methods can be used for analyzing the layout of the input image data, cutting out the areas, and sorting the cut areas by attribute.

For example, one known method may be performed in a configuration in which a circumscribed rectangle detecting part extracts a rectangle circumscribing to a black picture element coupling component out of the document image data compressed in an image memory. The extracted rectangles include the rectangles of attributes like the ruled lines, tables, diagrams, graphs, etc., in addition to a rectangle of characters (a character string of a character or two characters or more). A rectangle sorting part sorts the attributes of such rectangles based on the shape information and the internal data on the rectangles. A character area integrating part integrates the character rectangle with other sorted rectangles to generate a character area. Then, the identifying result of an area identifying part is utilized by a character recognizing part for recognition of characters.

Further, another known method may be performed in a configuration in which a parameter setting part sets different plural parameter sets corresponding to the result of simplified judgment of input document structure by a simplified document structure judging part. An area dividing part divides the area of an input document for every set parameter set and stores result data in a memory. These result data are sorted in the order from high frequency of usage of parameter or from the high degree certainty by a display order deciding part and displayed on a display successively from the first rank. Plural pieces of result data can be reduced and simultaneously displayed on the display as well.

When selecting or searching desired image data visually from multiple image data, the desired image data may generally be figured out, not by understanding the contents of the overall document but by taking a quick look over remarkable areas including graphics, photographs, titles, etc. Accordingly, as shown in FIG. 4, image data of an original document 110, for example, may be cut out into image areas to sort the image areas according to attribute, such as a graphic area R1, a photograph area, a table area R2, and a title area R3. Further, "R4" represents a text area. Each of the respective image areas sorted according to attribute may be associated with the image data of the original document 110 and stored as representative distinctive feature areas. The image data can be stored in the auxiliary storage unit 6 or in any other auxiliary storage unit connected via the communication unit 7 to the network.

Figure 5:
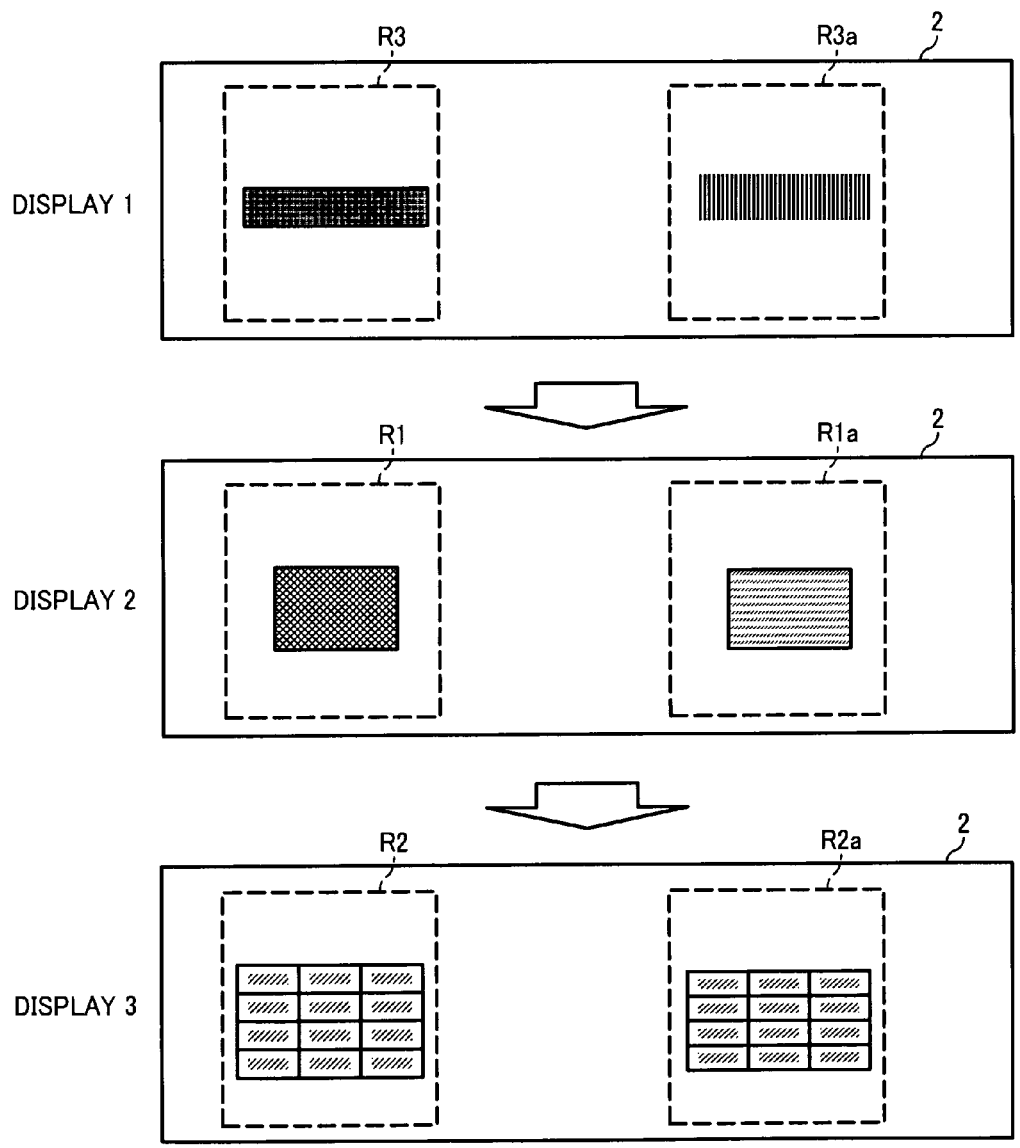
FIG. 5 is a schematic drawing of a display screen sequentially displaying representative distinctive feature images similar to specified image data, according to an example embodiment of the present patent application.

Referring to FIG. 5, a schematic drawing of the display screen of the image display unit 2 is displayed, where the representative distinctive feature area images similar to each other are sequentially displayed in a switching manner.

When the stored image data is called, images of at least one area of the graphic area R1, the table area R2, and the title R3, which are associated with the stored image data, and images of representative (partial) areas, such as a graphic area R1a, a table area R2a, and a title area R3a, of the stored image data may be transmitted sequentially to the image display unit 2 in given time intervals in the order of DISPLAY 1→DISPLAY 2→DISPLAY 3 in FIG. 5 so that the image display unit 2 can sequentially display these images by same category or type on the screen in a switching manner, as shown in FIG. 5. That is, the image display unit 2 may display the title area R3 and the title area R3a that has an image similar to the image in the title area R3 side by side as shown in DISPLAY 1 of FIG. 5, then after the given time interval, switch the screen to display the graphic area R1 and the graphic area R1a that has an image similar to the image in the graphic area R1 side by side as shown in DISPLAY 2 of FIG. 5, and after the given time interval, switch the screen again to display similar images of the table area R2 and the table area R2a that has an image similar to the image in the table area R2 side by side as shown in DISPLAY 3 of FIG. 5. Thus, the images of the graphic area R1, the table area R2, and the title area R3 are stored in the auxiliary storage unit 6 and the respective similar images of the graphic area R1a, the table area R2a, and the title area R3a are also stored in the auxiliary storage unit 6 in association with the images of the graphic area R1, the table area R2, and the title area R3, respectively, and therefore, these images may be sequentially displayed as shown in FIG. 5 according to each original size or magnification of the representative distinctive feature area images. By so doing, desired image data can easily be recognized and selected out of the stored image data including similar respective distinctive feature areas.

Further, when displaying the representative distinctive feature areas on the display screen of the image display unit 2, the images of the representative distinctive feature areas may be shown at the same magnification as depicted in the original document 10 (for example, see FIG. 5 to be shown later).

The flowchart of FIG. 3B shows the procedure of the above-described operation. That is, the image data is loaded (step S201), the display screen of the distinctive feature areas are updated to show a first attribute group of the distinctive feature areas (step S202), the display screen of the distinctive feature areas are sequentially switched after the given time intervals (step S203), and it is determined whether the desired image data is selected or not (step S204).

When the desired image data is selected, the result of step S204 is YES, and the image data is output (step S205).

When the desired image data is not yet selected, the result of step S204 is NO, and the procedure returns to step S202 to repeat the operation.

As described above, the procedure of the above-described operation shown in FIG. 5 may be executed by switching the images of the multiple attribute-based areas, e.g., the graphic area R1, the table area R2, and the title area R3 and the images of the representative distinctive feature areas, e.g., the graphic area R1a, the table area R2a, and the title area R3a displayed on the image display unit 2 in the given time intervals. Alternatively, an operator can perform the above-described switching operation.

Figure 6:
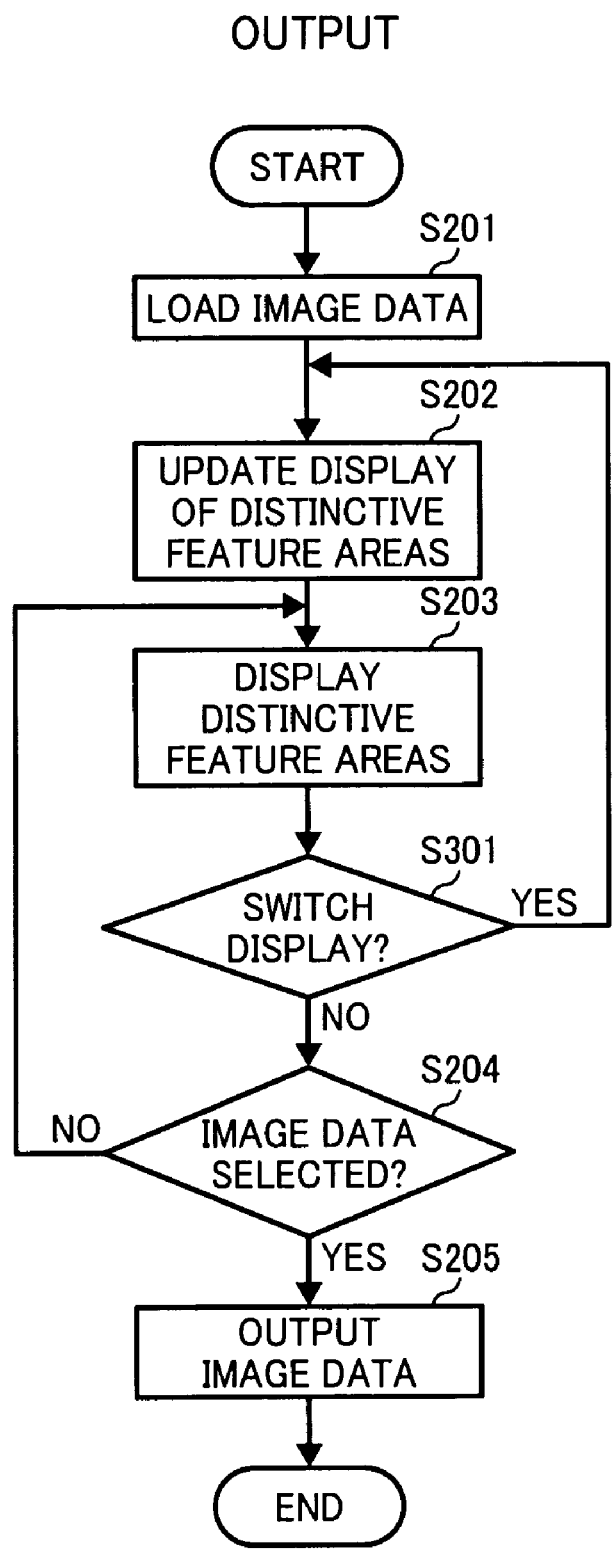
FIG. 6 is a flowchart for performing a procedure of an operation performed according to instructions by an operator.

FIG. 6 is a flowchart showing a procedure of the above-described operation performed according to instructions by the operator. Steps performing the same operations as shown in the previously described embodiment(s) are denoted by the same reference numerals throughout the present patent application and redundant descriptions are omitted.

In the procedure of the above-described operation shown in the flowchart of FIG. 6, the display screen of the distinctive feature areas are sequentially switched after the given time intervals in step S203, and it is determined whether the images on the image display unit 2 are switched or not (step S301).

When the images on the image display unit 2 are switched, the result of step S301 is YES, and the procedure returns to step S202 to repeat the operation.

When the images on the image display unit 2 are not switched yet, the result of step S301 is NO, and the process proceeds to step S204.

By performing the above-described operation, when there are a plurality of the respective distinctive feature areas, the images cannot be displayed even after the given time interval. In this case, it is advantageous that the operation sends instructions to indicate or control the timing to switch the images on the image display unit 2. By so doing, it is more effective to select the desired image data.

As previously described, the image data is input in step S101. Depending on the input image data, it is likely that the image data includes inappropriate representative distinctive feature areas as the results of analyzing the layout, cutting out the area, and/or sorting the attribute of the area or includes unnecessary images. To avoid such inconvenience, after extracting possible representative distinctive feature areas, the extracted possible representative distinctive feature areas may sequentially be displayed on the image display unit 2 so that the operator can determine whether or not these extracted areas are stored in association with the image data in the auxiliary storage unit 6. In this case, after the operator has completed the above-described determination or the sorting operation with respect to each of the extracted areas, the image data and the respective distinctive feature areas selected and stored in the auxiliary storage unit 6 in association with the image data.

Figure 7:
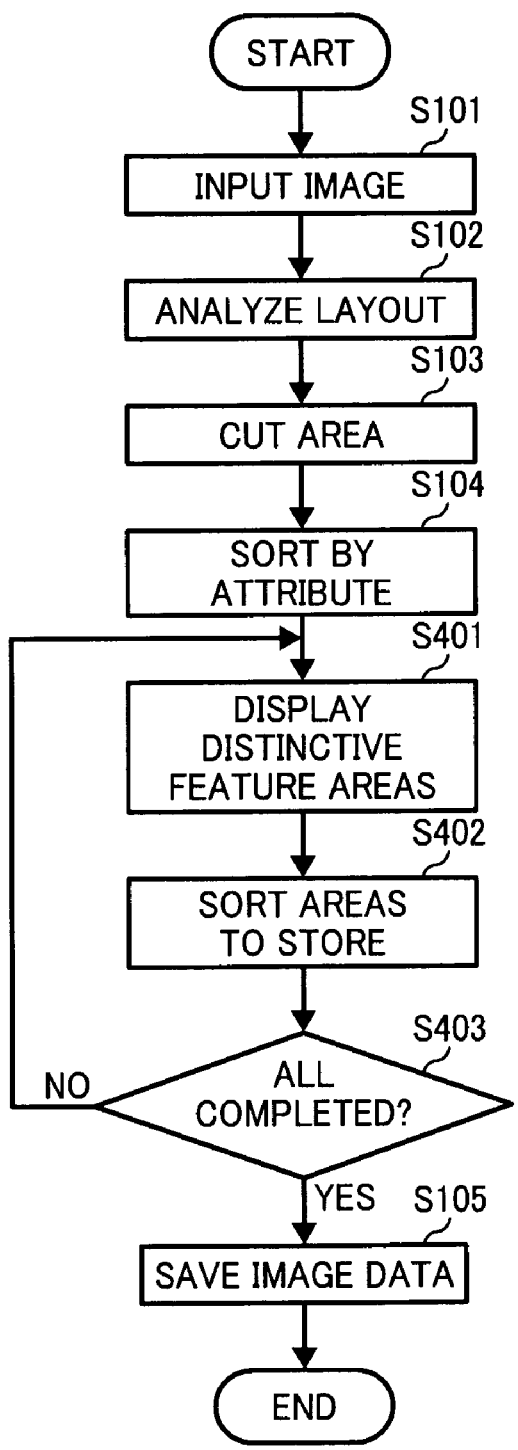
FIG. 7 is a flowchart for performing a procedure of an operation in which the operator determines whether or not to display a representative distinctive feature area stored in association with the image data.

FIG. 7 shows a flowchart showing a procedure of the above-described operation in which the operator selects and determines whether or not a representative distinctive feature area is stored in association with the image data.

In the procedure of the above-described operation shown in the flowchart of FIG. 7, after the operation of step S104 is completed, the extracted representative distinctive feature areas are sequentially displayed on the display screen of the image display unit (step S401). Then, the operator sorts the extracted representative distinctive feature areas whether to keep or discard by associating the representative distinctive feature area with the image data (step S402), and it is determined whether the sorting operation of the extracted representative distinctive feature areas is completed or not (step S403).

When the sorting operation of the extracted representative distinctive feature areas is completed, the result of step S403 is YES, and the process proceeds to step S105.

When the sorting operation of the extracted representative distinctive feature areas is not yet completed, the result of step S403 is NO, and the procedure returns to step S401 to repeat the operation.

By performing the above-described sorting operation of the extracted images of the representative distinctive feature areas, inappropriate areas and/or unnecessary areas can be discard and reduced, thereby effectively selecting the desired image data.

Further, depending on the contents of the input image data, it is likely that appropriate respective distinctive feature areas with respect to the image data may not be extracted as the results of analyzing the layout, cutting out the area, and/or sorting the attribute of the area. To avoid such inconvenience, after extracting possible representative distinctive feature areas, the extracted possible representative areas may sequentially be displayed on the image display unit 2 so that the operator can use the information input unit 3 to determine whether to hold or discard each of the extracted representative distinctive feature areas.

After the operator has completed the above-described selection by using the information input unit 3, the image data of the representative distinctive feature areas that are not discarded are displayed on the image display unit 2, and the operator uses the information input unit 3 to associate the extracted representative distinctive feature areas with the image data to save and store the selected representative distinctive feature areas.

FIG. 8 shows a flowchart showing a procedure of the above-described operation in which the operator selects and determines whether or not to use the information input unit 3 to specify a representative distinctive feature area.

In the procedure of the above-described operation shown in the flowchart of FIG. 8, after the operation of step S104 is completed, the extracted areas are sequentially displayed on the image display unit 2 (step S501), and it is determined whether the operator adds a representative distinctive feature area (step S502).

When it is determined that the operator adds a representative distinctive feature area, the result of step S502 is YES, and the process proceeds to step S503 to input the information of the representative distinctive feature area and returns to step S502 to repeat the operation.

When it is determined that the operator does not add any (further) representative distinctive feature area, the result of step S502 is NO, and the process proceeds to step S105 to complete the procedure.

As described above, by performing the operation in which the operator specifies the representative distinctive feature area, the failure to extract the representative distinctive feature area can be prevented, thereby effectively selecting the desired image data.

In the above-described operations, the representative distinctive feature area can be obtained as a result of analyzing the layout in step S102, cutting the areas in step S103, and sorting the representative distinctive feature area by attribute in step S104. Therefore, it is also possible to recognize image data by sorting the image data according to the property of each distinctive feature areas. In the present patent application, the property of each distinctive feature area corresponds to, for example, position of a specific portion such as the center of gravity of a distinctive feature area, size of a distinctive feature area, and attribute of a distinctive feature area.

1) In the Order According to Location of a Specific Portion:

In this case, the extracted image data is sorted in the order according to a location of a specific portion to display the images of the representative distinctive feature areas in this order on the image display unit 2.

Generally, we read a text image from top left to bottom right. When the representative distinctive feature areas are displayed in the same order as the appearance of the texts for reading in the text image, the representative distinctive feature areas can be distinguished as we read.

Thus, the display of the representative distinctive feature areas in the order according to location can help intuitively search the contents of the image data, thereby effectively selecting the desired image data.

2) In the Order According to Size of a Specific Portion:

In this case, the extracted image data is sorted in the order according to a size of a specific portion to display the images of the representative distinctive feature area in this order on the image display unit 2.

Amongst the representative distinctive feature areas included in the image data, a representative area having a larger size is generally more distinguishable. Therefore, the image data can be distinguished according to a larger-sized distinctive feature area than a smaller-sized distinctive feature area from the representative distinctive feature areas included in the image data.

Thus, the display of the representative distinctive feature areas in the order according to size can help intuitively search the contents of the image data, thereby effectively selecting the desired image data.

3) In the Order According to Attribute Information of a Specific Portion:

In this case, the extracted image data is sorted in the order according to attribute information of a specific portion to display the images of the representative distinctive feature area in this order on the image display unit 2.

Amongst the representative distinctive feature areas included in the image data, an impressive representative area such as a photograph area or a graphic area is generally more distinguishable than a text area or a title area.

Thus, the display of the representative distinctive feature areas in the order according to attribute information can help intuitively search the contents of the image data, thereby effectively selecting the desired image data.

In step S202 in the flowchart of FIG. 3B, the display of the distinctive feature areas are updated in the given time intervals. Alternatively, the timing to update the display can be changed according to attribute of the distinctive feature areas.

When compared with a distinctive feature area including a graphic image or photo image, a distinctive feature area including a text image may require more time to read the text image. Therefore, it is difficult for the distinctive feature area including a text image to spend the same time as the distinctive feature area including a graphic image. That is, more time may be needed to recognize the contents of the distinctive feature area including a text image than the distinctive feature area including a graphic image.

To cover the above-described inconvenience, in step S104, the attribute recognized when the image data is input is checked so that the given time interval can be controlled to be longer when the attribute is found to be an area including text. According to this operation, the operator can read the text area securely to help understand the contents of the image data. As a result, the desired image data can be selected effectively.

Further, it can be controlled that a user can arbitrarily set an order or time to display an image of each distinctive feature area.

When displaying the representative distinctive feature areas on the display screen of the image display unit 2, the images of the representative distinctive feature areas may be shown at the same magnification as depicted in the original document 10, for example, as shown in FIG. 5. However, the magnification of the images of the representative distinctive feature areas can be changed.

Generally, most of image processing apparatuses or image forming apparatuses such as multifunctional peripherals or MFPs include an image display unit with a small screen, corresponding to the image display unit 2. Therefore, a distinctive feature area, which may be a partial area of image data, may not fit a displayable area of the small screen of the image display unit 2.

On the contrary, there may be a case that a small or less distinguishable image area is displayed on a large display area of the image display unit 2.

Therefore, as shown in FIG. 9, the sizes of the areas sorted by attribute and the representative distinctive feature areas can be varied to a size thereof to fit the display screen of the image display unit 2. By so doing, the desired image data can be selected effectively.

In FIG. 9, the enlarged areas sorted by attribute correspond to a graphic area R1b, a table area R2b, a title area R3b and the representative distinctive feature areas correspond to a graphic area R1c, a table area R2c, and a title area R3c. The images displayed on the image display unit 2 may be switched in the order of DISPLAY 1→DISPLAY 2→DISPLAY 3.

As shown in FIG. 9, when respective sizes of the graphic area R1c, the table area R2c, and the title area R3c of the representative distinctive feature areas are varied to fit the display screen of the image display unit 2. Similar to the representative distinctive feature areas of FIG. 9, the images of the representative distinctive feature areas can be varied as shown in FIG. 10 while storing each relative size ratio of the graphic area R1, the table area R2, and the title area R3. That is, each of the areas sorted by attribute and the distinctive feature areas may be varied according to a magnification ratio by which the image of the representative distinctive feature area R3 having a largest size is varied to the size of the image of a title area R3d, which corresponds to the title area R3b, to be fit to a display area 2a of the image display unit 2.

In FIG. 10, a graphic area R1d and a table area R2d of the areas sorted by attribute include the images varied according to the magnification ratio of the representative distinctive feature area R3, and a graphic area R1e and a table area R2e of the representative distinctive feature areas include the images varied according to the same magnification ratio. The sizes of the graphic area R1d and the table area R2d are varied according to a magnification ratio used to vary the size of the title area R3. The sizes of the graphic area R1e and the table area R2e of the representative distinctive feature areas are varied according to the same magnification ratio as the graphic area R1d and the table area R2d. With the above-described operation, relative size difference of the original image can be maintained even after the sizes of these areas are enlarged or reduced. Therefore, the respective image data can be distinguished intuitively according to the difference in size of the representative distinct feature areas. It is noted, however, that the image needs to be distinguishable. To avoid the image to be beyond recognition due to an extreme size reduction of the image to display, a lower limitation of the magnification may need to be specified.

The images displayed on the image display unit 2 may be switched in the order of DISPLAY 1→DISPLAY 2→DISPLAY 3.

Thus, by storing the ratio of size of the representative distinctive feature areas, the user can intuitively search the contents of the image data, thereby effectively selecting the desired image data.

When the sizes of the representative distinctive feature areas are varied to fit the representative distinctive feature areas to the display screen of the image display unit 2, the magnification ratio of each of the representative distinctive feature areas are modified by attribute.

For example, when the representative area includes a text area such as a title area, the text area tends to be less distinguishable than a graphic area or a photo area. Therefore, when the representative area has an attribute of text, the size of the representative area may be varied according to a magnification ratio greater than the other representative areas. By so doing, the user can intuitively search the contents of the image data, thereby effectively selecting the desired image data.

Further, the operator can add a mode to manually select to display a list showing the whole representative distinctive feature areas of the specified image data on the image display unit 2. Thus, by adding such a mode, the user can intuitively search the contents of the image data, thereby effectively selecting the desired image data.

As one of the representative distinctive feature areas to display, a reduced image of the entire image data can be added. By adding a reduced image of the image data, not only the representative distinctive feature areas can be sequentially switched and displayed but also information of the layout of the representative distinctive feature areas can be obtained.

With the above-described operation, the user can intuitively search the contents of the image data, thereby effectively selecting the desired image data.

As described above, the following advantages can be achieved according to at least one example embodiment of the present patent application.

(1) A plurality of representative distinctive feature areas included in image data may be extracted and stored in association with the image data. By sequentially switching the display of the plurality of representative distinctive feature areas, the image data including the distinctive feature areas similar to each other can be recognized on an image display unit, thereby efficiently selecting the desired image data.

(2) According to instructions sent by an operator, the plurality of representative distinctive feature areas can be switched to display sequentially. By so doing, the desired image data can be selected effectively.

(3) After the distinctive feature extracting unit 4 extracts the representative distinctive feature areas, the operator can select areas to be stored and areas to be discard out of the extracted distinctive feature areas, thereby effectively selecting the desired image data.

(4) The operator may specify the representative distinctive feature area(s) so as to avoid a change to fail extracting necessary representative distinctive feature area(s). With the above-described operation, the desired image data can effectively be selected.

(5) The image data of the representative distinctive feature areas may be displayed in the order according to a location, a size, or attribute information. This can help the operator to intuitively search the contents of the image data. With the above-described operation, the desired image data can effectively be selected.

(6) A distinctive feature area having an attribute corresponding to a text area may have a longer time period or a greater magnification ratio to be displayed on the image display unit 2. This operation can help the operator to intuitively search the contents of the image data, thereby effectively selecting the desired image data.

(7) The image size of a representative distinctive feature area can be reduced or enlarged to fit a display screen of the image display unit 2, thereby effectively selecting the desired image data.

(8) The ratio of size of the representative distinctive feature area can be stored to display the image of the representative distinctive feature area. This operation can help the operator to further intuitively search the contents of the image data. Accordingly, the desired image data can be selected effectively.

(9) By adding a mode for the operator to manually select to display a list showing the whole representative distinctive feature areas of the specified image data on the image display unit, the operator can intuitively search the contents of the image data, thereby effectively selecting the desired image data.

(10) As one of the representative distinctive feature areas to display, a reduced image of the entire image data can be added. By so doing, the user can intuitively search the contents of the image data, thereby effectively selecting the desired image data.

The above-described example embodiments are illustrative, and numerous additional modifications and variations are possible in light of the above teachings. For example, elements and/or features of different illustrative and example embodiments herein may be combined with each other and/or substituted for each other within the scope of this disclosure and appended claims. It is therefore to be understood that within the scope of the appended claims, the disclosure of this patent specification may be practiced otherwise than as specifically described herein.

Example embodiments being thus described, it will be obvious that the same may be varied in many ways. Such variations are not to be regarded as a departure from the spirit and scope of the present patent application, and all such modifications as would be obvious to one skilled in the art are intended to be included within the scope of the following claims.

What is claimed is:

1. An image retrieval apparatus, comprising:
    an input unit configured to input an image data;
    an extracting unit configured to extract feature area images from the inputted image data such that each of the feature area images represent a partial area of the inputted image data;
    a storage unit configured to store the image data in association with the extracted feature area images;
    a retrieving unit configured to retrieve a target image similar to specified image data from the storage unit, each of the specified image data having feature area images that represent a partial area of the specified image data and the target image having feature area images that represent a partial area of the target image;
    a display unit configured to display each of the feature area images of the specified image data together with a corresponding feature area image of the target image such that each of the feature area images representing the partial area of the specified image data is displayed simultaneously with a corresponding feature area image representing the partial area of the target image; and a display control unit configured to vary a displaying time interval that is a time of displaying the feature area images of the specified image data and the target image according to an attribute of the feature area images, the display control unit configured to control the display unit to display the feature area images in the displaying time interval in an order according to the attribute of the feature area images.

2. The image retrieval apparatus according to claim 1, wherein the display control unit controls a size of the feature area image displayed on the display unit according to a ratio of a size of the display unit to a size of the feature area image, and causes the display unit to display the feature area image in the size of the feature area image.

3. The image retrieval apparatus according to claim 1, wherein the display control unit sorts the feature area images to determine whether each of the feature area images is displayed or not according to the attribute.

4. The image retrieval apparatus according to claim 1, wherein the display control unit obtains, in advance, a location of a representative area of the feature area image, and determines an order of display of representative areas images according to location when representative areas images are switched to display.

5. The image retrieval apparatus according to claim 1, wherein the display control unit obtains, in advance, size of a representative area of the feature area image, and determines an order of display of the representative feature areas images according to size when representative areas images are switched to display.

6. The image retrieval apparatus according to claim 1, wherein the display control unit obtains, in advance, attribute information of the feature area image, and determines an order of display representative feature area images according to the attribute information when representative feature areas images are switched to display.

7. An image retrieving method for retrieving a target image similar to specified image data, the method comprising:
   inputting an image data into a storage unit;
   extracting feature area images from the inputted image data such that each of the feature area images represent a partial area of the inputted image data;
   storing the image data in association with the extracted feature area images;
   retrieving the target image similar to the specified image data from the storage unit, each of the specified image data having feature area images that represent a partial area of the specified image data and the target image having feature area images that represent a partial area of the target image;
   displaying each of the feature area images of the specified image data together with a corresponding feature area image of the target image on a display unit such that each of the feature area images representing the partial area of the specified image data is displayed simultaneously with a corresponding feature area image representing the partial area of the target image;
   wherein the displaying step includes,
      varying a displaying time interval that is a time of displaying the feature area images of the specified image data and the target image according to an attribute of the feature area images,
      displaying the feature area images in the displaying time interval in an order according to the attribute of the feature area images.

8. The image retrieving method according to claim 7, wherein the displaying step comprises displaying the feature area images according in a size of the feature area images.

9. The image retrieving method according to claim 7, wherein the displaying step comprises sorting the feature area images to determine whether each of the feature area images is displayed or not according to the attribute.

10. The image retrieving method according to claim 7, wherein the displaying step comprises:
   obtaining, in advance, a location of a representative area of the feature area image; and
   determining an order of display of representative areas according to location when representative areas images are sequentially switched to display.

11. The image retrieving method according to claim 7, wherein the displaying step comprises:
   obtaining, in advance, a size of a representative area of the feature area image; and
   determining an order of display of the distinctive feature areas according to size when representative area images are sequentially switched to display.

12. The image retrieving method according to claim 7, wherein the displaying step comprises:
   obtaining, in advance, attribute information of the feature area image; and
   determining an order of display of representative feature area images according to the attribute information when representative area images are sequentially switched to display.

13. A storage medium storing a machine-readable program for causing an image retrieval apparatus included in an image forming apparatus to perform an image retrieving method for retrieving a target image similar to specified image data, the image retrieving method comprising:
   inputting an image data into a storage unit;
   extracting feature area images from the inputted image data such that each of the feature area images represent a partial area of the inputted image data;
   storing the image data in association with the extracted feature area images;
   retrieving the target image similar to the specified image data from the storage unit, each of the specified image data having feature area images that represent a partial area of the specified image data and the target image having feature area images that represent a partial area of the target image;
   displaying each of the feature area images of the specified image data together with a corresponding feature area image of the target image on a display unit such that each of the feature area images representing the partial area of the specified image data is displayed simultaneously with a corresponding feature area image representing the partial area of the target image;
   wherein the displaying step includes,
      varying a displaying time interval that is a time of displaying the feature area images of the specified image data and the target image according to an attribute of the feature area images,
      displaying the feature area images in the displaying time interval in an order according to the attribute of the feature area images.

14. The image retrieval apparatus according to claim 1, wherein the display control unit controls the displaying time interval as the displaying time interval of the attribute of the feature area image including a text image is longer than the displaying time interval of the attribute of the feature area image not including a text.

15. The image retrieval method of claim 7, wherein the displaying time interval of the attribute of the feature area image including a text image is longer than the displaying time interval of the attribute of the feature area image not including a text.

* * * * *

UNITED STATES PATENT AND TRADEMARK OFFICE
CERTIFICATE OF CORRECTION

| | |
|---|---|
| PATENT NO. | : 8,400,466 B2 |
| APPLICATION NO. | : 12/076020 |
| DATED | : March 19, 2013 |
| INVENTOR(S) | : Shinobu Yamamoto |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 866 days.

Signed and Sealed this
Ninth Day of December, 2014

Michelle K. Lee
*Deputy Director of the United States Patent and Trademark Office*